May 29, 1928. 1,671,464

J. BROMBACHER

MIXING DEVICE

Filed March 30, 1927 2 Sheets-Sheet 1

INVENTOR.
Julius Brombacher
BY
ATTORNEY

May 29, 1928.

J. BROMBACHER 1,671,464

MIXING DEVICE

Filed March 30, 1927

INVENTOR.
Julius Brombacher
BY
ATTORNEY

Patented May 29, 1928.

1,671,464

UNITED STATES PATENT OFFICE.

JULIUS BROMBACHER, OF SANTA MONICA, CALIFORNIA.

MIXING DEVICE.

Application filed March 30, 1927. Serial No. 179,471.

This invention relates to a device for burning a gaseous fuel, and it has especial reference to a means for mixing a gaseous fuel and air to provide a homogenous combustible fluid.

The objects of the invention is to provide a device in which a gaseous fuel may be mixed with air in proper and in the most efficient ratio with air, so that but the minimum amount of air essential to complete combustion is contained in the mixture.

Another object of the invention is to provide a mixing device wherein an intense intermingling of air and gaseous fuel may be accomplished and wherein the process of mixing of the air and gaseous fuel is intensified, and the quantity of air required for combustion of the gaseous fuel may be restricted to the minimum.

Another object of my invention is to provide a mixing device in which the kinetic energy of the gaseous fuel may be utilized for accelerating the induction of the quantity of air required for combustion.

Another object of my invention is to provide a simple and efficient mixer in which the proper amount of air is inducted by the gaseous fuel, thereby obviating the need for auxiliary air-supply and eliminating all uncertain quantities.

Another object of this invention is to provide a mixer in which all changes of speed of the combustible fluid as well as the mixture occurs at a constant rate of acceleration, thus requiring the least amount of potential energy of the gaseous fuel.

Another object of the invention is to provide a mixing device in which back firing at the critical speed of the mixture, that is, when the speed of combustion of the fuel mixture is greater than the speed of the fuel issuing from the burner, is possitively prevented.

Another object of my invention is to provide a mixing device in which ignition of the gaseous fuel at the source of issuance is effectually prevented.

Another object of my invention is to provide a device of this character in which an accurate adjustment of the air intake may be effected and in which a uniform regulation of the air and gaseous fuel may be simultaneously brought about.

Another object of the invention is to provide a mixer which may be readily adapted to gaseous fuels of different specific gravities.

Finally a further object of my invention is to provide a simple mixer of few, readily accessible parts, requiring no special tools for assembly.

Other objects will appear from the following specification in connection with the accompanying drawings, which illustrate a preferred form of embodiment of my invention and in which Fig. 1 is a sectional elevation, partly in section, showing my invention.

Figure 1:
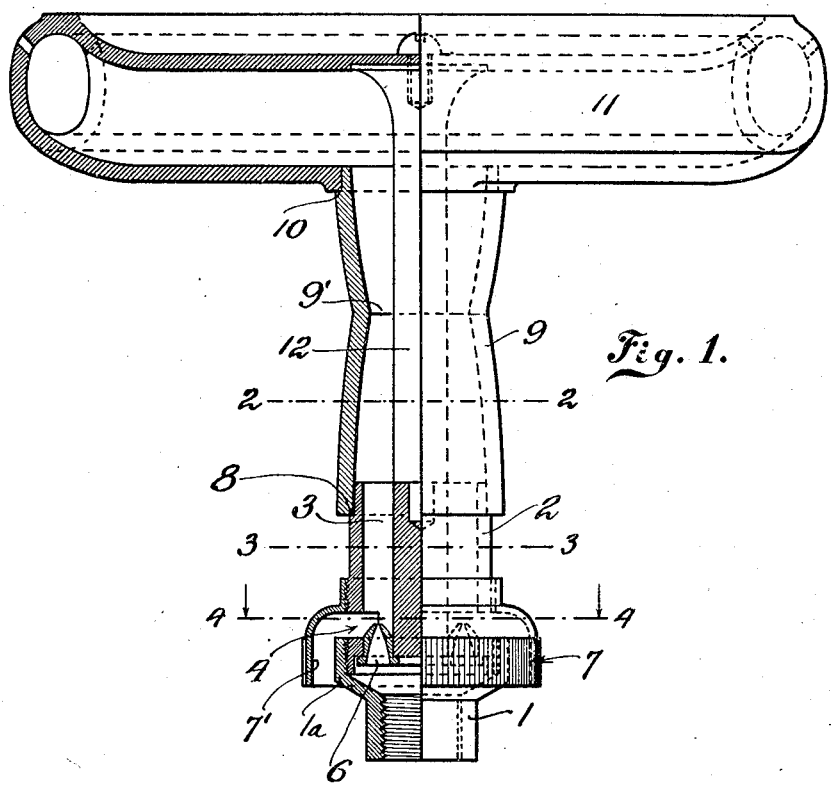
Figure 2:
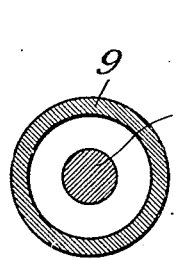
Fig. 2 is a section on line 2—2 Fig. 1.
Figure 4:
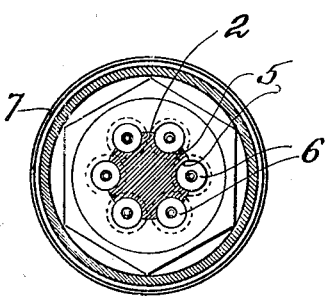
Fig. 4 is a section on line 4—4 Fig. 1.
Figure 3:
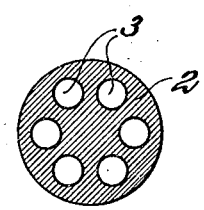
Fig. 3 is a section on line 3—3 Fig. 1.

Referring with particularity to the form of embodiment of the invention shown in the accompanying drawings, in which like characters of reference indicate like parts, 1 designates a fitting or nipple arranged for attachment to a supply line for a gaseous fuel. The nipple or fitting 1 is formed with an enlarged portion 1ª forming substantially a gas chamber, which is internally threaded for the reception of an injecting means, which in the form shown in the drawing, consists of a cylindrical body 2 having a plurality of equally spaced, longitudinal injector passageways 3 and provided near the bottom thereof with an inwardly extending annular groove 4 which communicates with said passageways. The radial depth of said groove 4 terminates substantially on a line coincident with the center of said passageways 3, providing thereby a plurality of equally spaced semi-cylindrical recesses 5 for purposes to appear presently. Through the bottom of said cylindrical body is extended a plurality of equally spaced jets 6, which are in open communication with the enlarged portion 1ª of the nipple 1, to receive and convey a gaseous fuel therethrough. The apexes of these jets 6, which are concentric with the passageways 3, project into said annular groove 4 substantially centrally of the height thereof and the projecting portion of said jets 6 are surrounded on one side by the recesses 5 referred to. In this manner there is provided for each jet 6 the exact width of air port required and this width is equal approximately to the diameter of the injector passageways. The total sum of the area of the inlets to the jets 6 is equal to the diametrical area of the supply pipe and thereby variations in the velocity of the gas flow occur at a constant rate, avoiding thereby spasmodic impulses and providing the maximum speed required for mixing. The gaseous fuel then passes through the jet at a constant rate of acceleration, the maximum speed of travel being attained at the apexes thereof.

The cylindrical body 2 is provided with a means for regulating the height of the annular groove 4, which is substantially an air port common to all of the jets 6, and thereby govering the determinate minimum of air required for a perfect combustion of the gaseous fuel. This regulating means, in this instance, comprises preferably a bell shaped sleeve 7, mounted for adjustment on said cylindrical body preferably by threaded engagement therewith. The dependent bell shaped portion 7' of said sleeve 7 is diametrically larger than the cylindrical body 2 and surrounds the annular port 4 and the enlarged portion 1ª of the nipple 1, providing thereby an air intake. By adjusting this bell-shaped sleeve 7 relatively to the cylindrical body 1, the height of the annular groove 4 is regulated and thereby the volume of air inducted by the action of the jetted gaseous fuel is controlled.

The cylindrical body 2 is provided near the top thereof with an annular shoulder 8 forming a seat for a mixing chamber, which as shown in Fig. 1, consists of a tube 9 having a constricted area or throat 9', and constituting thereby a Venturi tube. The distance of the throat 9' from the top of the cylindrical body 2 is preferably twice the diameter of the throat 9. The upper end of the Venturi-tube is shouldered, as at 10, to receive and support a burner 11.

In order to prevent the creation of a vacuum axially of said mixing chamber 9, I provide a cylindrical column 12, centrally of said Venturi-tube 9. This column 12, at its lower end is arranged to be connected with the cylindrical body 2, and at its upper end, which is formed for deflecting the gaseous mixture, is connected to the inside of the burner 11.

Figure 5:
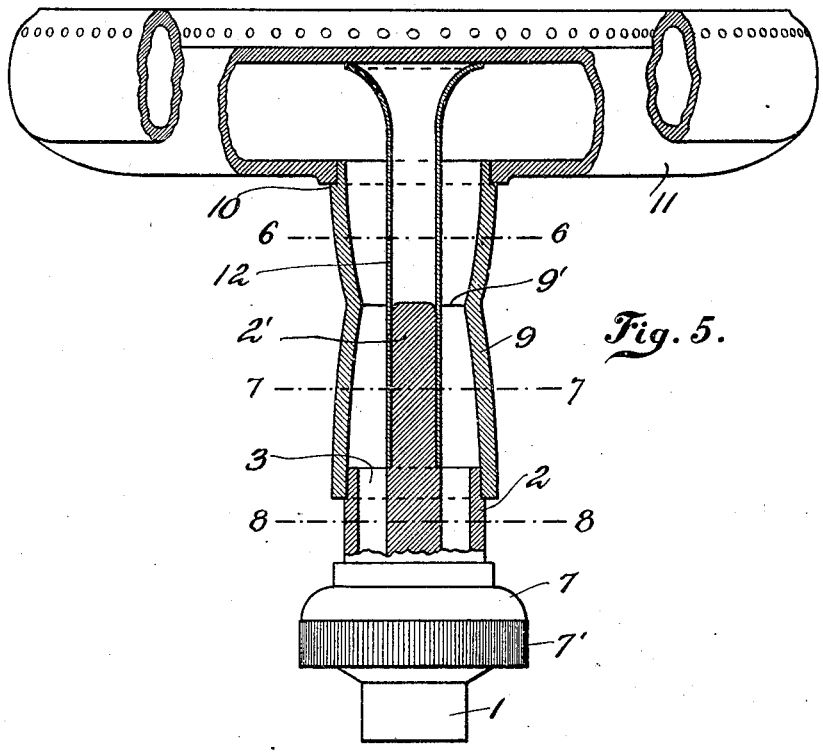
Fig. 5 is a sectional elevation of a slightly modified form of my invention.
Figure 6:
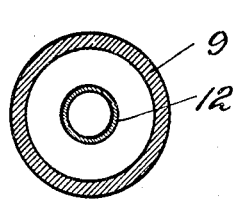
Fig. 6 is a section on line 6—6 Fig. 5.
Figure 7:
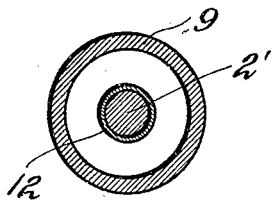
Fig. 7 is a section on line 7—7 Fig. 5.
Figure 8:
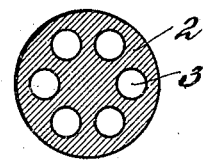
Fig. 8 is a section on line 8—8 Fig. 5.

The cylindrical column 12, may be made adjustable for accommodating same to different heights and types of burners. For this purpose the cylindrical body 2, Fig. 5, is provided with a central extension 2', which reaches to the constricted area or throat 9' of the Venturi tube 9, and over this extension is fitted for vertical adjustment a column 12.

In this chamber 9, the thorough mixing of the gas and air issuing from the injector passageways 3 takes place under pressure caused by the accumulation of the air and gas in the Venturi tube 9, and the mixture then travels to the burner where combustion occurs. Substantially no appreciable mixture of air with the gas occurs in the air port 4 or the injector passageways 3. Through the air port and the passageways 3 the required minimum of air, with the required velocity is induced by the jets of gas, by which the air is carried upwardly into the mixing chamber 9 of the Venturi tube, where an intense intermingling of the air and gas takes place, and since the jets of gas are concentric with the passageways and hence pass through the central area thereof, the air induced and also passing upwardly with the gas, surrounds the gaseous fluid without intimately mixing with it. The injector passageways 3 are of a length that will prevent ignition of the gas at the jets, due to backfiring, which results from a lean mixture at very low pressures. The explosion of this lean mixture inside the burner creates a pressure in the injector passageways 3, compressing to a certain degree the excessive air and producing a non-combustible mixture at the jets. By thus providing injector passageways of determinate lengths, ignition of the fuel at the jets is effectively prevented. The length of the injector passageways is also calculated to bring about an equalization of the speed of the gas and of the indrawn air, which equalization must occur within the injector passageways and before the gas and air enter the mixing chamber 9. By thus equalizing the speeds of the gas and air, a proper proportion of the two fluids is obtained. Without this equalization, the combustion of the mixture will be incomplete. Furthermore, the enlarged area of the mixing chamber 9 immediately above the injector passageways 3 effectively resists the travel of the flame and pressure resulting from a backfire and also assists in a marked degree in preventing ignition of the combustible fluid at the jets.

I have heretofore referred to the chamber 2 as being cylindrical, but it will be obvious that any other form may be employed to obtain the effects and objects hereinbefore pointed out.

What I claim, is:

1. A gas mixer and burner comprising a gas chamber arranged for attachment to a gas supply, a cylindrical body arranged for connection with said chamber and provided with a plurality of longitudinal injector passageways, said body having a circumferential air port the radial depth of which terminates on a line substantially central of the injector passageways; a plurality of gas jets extended through the bottom of said cylindrical body into said air port and communicating with said gas chamber, means adjustable on said body to regulate the height of said air port and control the quantity of air inducted by the fuel issuing from said jets, a gas and air mixing chamber carried by said body, and a burner supported by said mixing chamber.

2. A device for mixing air with a gaseous fuel and for burning the mixture, comprising a gas chamber arranged for attachment to a gas supply, a cylindrical body threaded in said chamber and provided with a plurality of injector passageways, said body having a circumferential air port communicating with said passageways, a plurality of jets extending through said body into said air port and communicating with said gas chamber, means adjustable on said cylindrical body to control the quantity of air inducted by the fuel passing from said jets into said passageways, a Venturi tube carried by said cylindrical body, and a burner supported by said Venturi tube.

3. A device for mixing air with a gaseous fuel and for burning the mixture, comprising a gas chamber arranged for attachment to a gas supply, a cylindrical body threaded in said chamber and provided with a plurality of longitudinal injector passageways, said body having a circumferential air port near the bottom thereof, a plurality of jets extending through the bottom of said body and into said circumferential air port to the center thereof, said jets communicating with said gas chamber and being concentric with said passageways, means adjustable on said body to regulate the quantity of air inducted through said port by the fuel issuing from said jets, a mixing chamber in which the mixture of gas and air is effected, means in said mixing chamber to prevent the formation of a vacuum, and a burner carried by said mixing chamber.

4. A device for mixing air with a gaseous fuel and for burning the mixture, comprising a gas chamber arranged for attachment to a gas supply, a body arranged for connection with said gas chamber and provided with a plurality of equally spaced passageways extending longitudinally of said body, said body having a circumferential groove terminating on a line central of said passageways, a plurality of equally spaced jets extending through the bottom of said body to the center of said circumferential groove, a means to adjust the area of said circumferential groove to regulate the air inducted by the fuel issuing from said jets, a tube carried by said body and having a constricted throat approximately centrally thereof, a burner carried by said tube, and a column extending centrally of said tube and connected to said burner to prevent the creation of a vacuum in the lower part of said tube.

5. A device for mixing air with a gaseous fuel and for burning the mixture, comprising a gas chamber arranged for attachment to a source of gas supply, a cylindrical body having a plurality of tubular passageways therein, and a circumferential groove near the bottom and extending inwardy to the center line of said passageways, a plurality of jets in said body communicating with said gas chamber and extending to the center of said circumferential groove, means operable on said body to regulate the height of said circumferential groove and thereby control the quantity of air inducted by the gas issuing from said jets, a mixing chamber carried by said body, and a burner carried by said mixing chamber.

6. A device for mixing air with a gaseous fuel and burning same comprising a cylindrical body having near the bottom thereof a circumferential groove and provided with longitudinal passageways which communicate with said groove, a plurality of jets in said body and concentric with said passageways, a gas chamber connected to said body, said jets communicating with said chamber and extending to the center of said groove, a mixing chamber on said body, a burner carried by said mixing chamber, and a means extending centrally through said mixing chamber to prevent the creation of a vacuum.

7. A device for mixing air with a gaseous fuel and burning same comprising a cylindrical body having a plurality of equally spaced tubular passageways, and an annular air port near the bottom thereof, the radial depth of said air port terminating centrally of said passageways, a plurality of equally spaced jets extending through the bottom of said body and substantially to center of said annular air port, the apexes of said jets being concentric with said passageways, a gas chamber to which said body is arranged to be connected, said jets communicating with said gas chamber, a mixing chamber for mixing the charges of air and gas issuing from said passageways, and a burner carried by said mixing chamber.

8. A device for mixing air with a gaseous fuel and for burning same comprising a cylindrical body arranged for connection with a source of gas supply and provided with a plurality of longitudinal passageways, and an annular air port near the lower end thereof, the radial depth of said air port extending to the center of said passageways and providing thereby semicircular recesses in said body, a plurality of jets extending through the bottom of said body and substantially to the center of said annular air port, said jets being surrounded on one side by said semicircular recesses and the apexes of said jets being concentric with said passageways, means adjustable on said body to regulate the height of said air port and thereby control the quantity of air inducted by the gas issuing from said jets, a mixing chamber on said body, means within said chamber to prevent the formation of a vacuum therein, and a burner carried by said mixing chamber.

9. A device for mixing air with a gaseous fuel and for burning same comprising a gas chamber, a cylindrical body connected therewith and provided with a plurality of longitudinal passageways and with an annular air port near the lower end thereof, the radial depth of said air port terminating centrally of said passageways, a plurality of jets extending through the bottom of said body and into said air port to the center thereof, said jets being concentric with said passageways, means adjustable on said body to regulate the height of said air port and control the quantity of air inducted by the issuance of gas from said jets, a mixing chamber on said body, a burner carried by said mixing chamber, and adjustable means within said mixing chamber to prevent the formation of a vacuum therein.

In testimony whereof I have set my hand.

JULIUS BROMBACHER.